INVENTOR.
RAYMOND A. SCHMIDT
FREDERICK A. WILHELM, JR.
WILLIAM W. KAYLE
Allan Ratner
ATTORNEY

INVENTOR.
RAYMOND A. SCHMIDT
FREDERICK A. WILHELM, JR.
BY WILLIAM W. KAYLE

Allan Ratner
ATTORNEY

INVENTOR.
RAYMOND A. SCHMIDT
FREDERICK A. WILHELM, JR.
WILLIAM W. KAYLE
BY Allan Ratner
ATTORNEY INVENTOR.
RAYMOND A. SCHMIDT
FREDERICK A. WILHELM, JR.
BY WILLIAM W. KAYLE
Allan Ratner
ATTORNEY INVENTOR.
RAYMOND A. SCHMIDT
FREDERICK A. WILHELM, JR.
WILLIAM W. KAYLE
BY Allen Ratner
ATTORNEY United States Patent Office 3,434,111

Patented Mar. 18, 1969

3,434,111

PROGRAM INTERRUPT SYSTEM

Raymond A. Schmidt, Oceanport, Frederick A. Wilhelm, Jr., and William W. Kayle, Eatontown, N.J., assignors to Electronic Associates, Inc., Long Branch, N.J., a corporation of New Jersey Filed June 29, 1966, Ser. No. 561,555

U.S. Cl. 340—172.5 12 Claims

Int. Cl. G11b *13/00*

ABSTRACT OF THE DISCLOSURE

A priority interrupt system is disclosed including a scanning system having a plurality of bit positions arranged in sequence according to priority significance. Each bit position includes logic circuitry to sense whether an interrupt is present. If no interrupt is present in that bit position a start-scan signal is propagated to the next least significant bit position scanning all priority interrupt lines until an interrupt request has been sensed.

This invention relates to a program interrupt system for a digital computer and more particularly to scanning the interrupt conditions.

It is known in the art to provide digital computers with program interrupt systems which interrupt the normal program sequence of the computer. Such interruptions of the program sequence are generally provided when two basic types of conditions occur. One of these relates to conditions which are internal and particular to the digital computer, and the other type relates to those conditions which are open ended and assigned as needed. With regard to internal machine conditions, these cannot be coped with by the digital computer program or by means of the hardware of the computer. Many of such conditions may be unforeseen (asynchronous) such as power failures, parity errors, exponent faults, etc.

On the other hand, open ended or arbitrarily assigned conditions are of the foreseen type. For example, in a hybrid analog-digital computer the computer operator may connect a group of integrators together to work a partial differential equation. After an answer is obtained the operator may desire to solve a new differential equation with the interconnected integrators. By means of an interrupt system in the digital portion of the computer, he may achieve this result.

Known interrupt systems operate in the following manner as the main program in the digital computer is running. The conditions are first queued up in the interrupt system. Priorities are assigned to the differing interrupt conditions and selection is made with regard to priority. The interrupt system halts the normal program sequence of the machine and generates a unique memory address associated with the highest priority condition that is selected. This address is generally associated with a subroutine placed at that address in memory by the computer operator or programmer to service the condition which caused the interrupt. The subroutine then performs its operation. The interrupt system is then signalled by way of a particular instruction that the subroutine is completed. At that time the system clears out the interupt condition that it had just serviced and sends a release signal to the source from which the interrupt signal originally came. Thus the main computer program can continue operation as before.

The interrupt system requires means to queue up or set up priorities of the interrupt conditions, i.e., which ones are to be serviced first, based on the choice of the programmer. This priority is achieved by a scanning system which may have two ways of setting priorities. In one way the physical positions are assigned to each interrupt position on the scanning system. In the other the programmer provides the interrupt conditions to be recognized by utilizing a masking system.

While prior scanning systems have responded to interrupt conditions, many of such systems left much to be desired in reliability, complexity of circuitry, and cost of the total system.

Accordingly, an object of the present invention is an interrupt system for servicing a plurality of interrupt conditions having a scanning system for receiving interrupt condition inputs in which the scanning system is of simple design while providing reliable operation.

In accordance with the invention there is provided a scanning system having a plurality of bit positions arranged in sequence according to priority significance from highest to lowest with each position having applied thereto an input indicative of an interrupt condition of corresponding significance. Each of the bit positions comprises a D.C. scanner flip-flop and a first and second AND gate. An interrupt condition circuit is provided for each position having applied thereto a corresponding interrupt condition input for providing an enable signal to the corresponding first gate when a true interrupt is applied.

Each scanner bit position is reset by the application of a scanner reset pulse to the input of each first gate, disabling that gate for the pulse duration prior to each scan. The scanner reset pulse is also applied to a delay network which after a fixed delay applies to start scan pulse to the highest priority scanner flip-flop which produces enable signals to the first and second AND gates. The output of each second gate is connected to the succeeding priority scanner flip-flop to apply a start-scan signal thereby to propagate a start-scan signal from position to position.

This propagation continues until a position is reached in which the corresponding first gate has all inputs enabled. Accordingly, that first gate produces a signal to the corresponding scanner flip-flop which provides a disabling signal to the corresponding second gate, thereby terminating the start-scan pulse to the succeeding bit position and preventing further propagation of the start-scan pulse. In this way there is provided a reliable scanning system comprised of substantially simple circuitry.

For further objects and advantages of the invention and for a more detailed discussion of its component parts and the manner of operation, reference is to be had to the following description taken in conjunction with the accompanying drawings, in which.

Figure 1A:
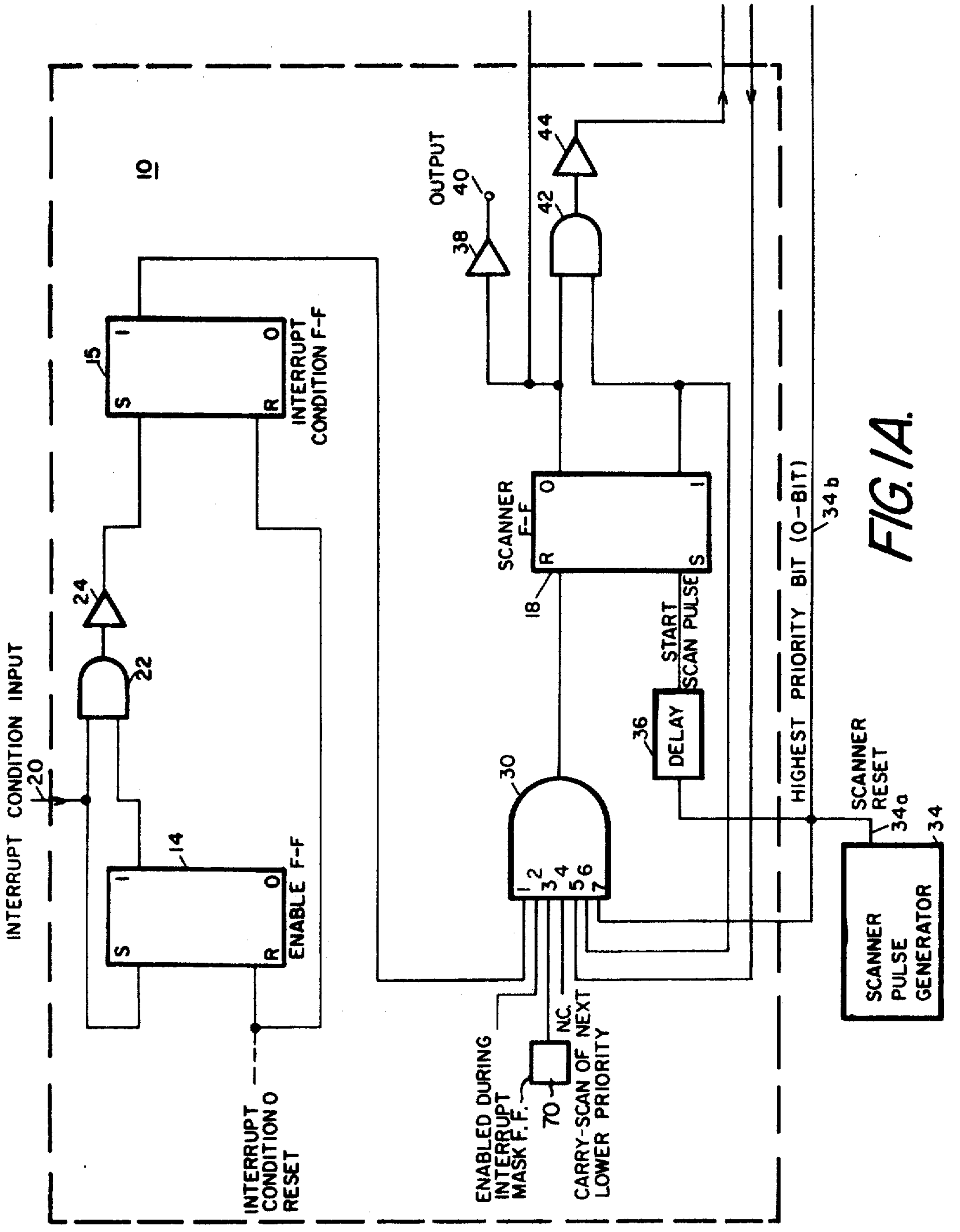
FIGURES 1A–1C is a block diagram schematically illustrating the invention.
Figure 1B:
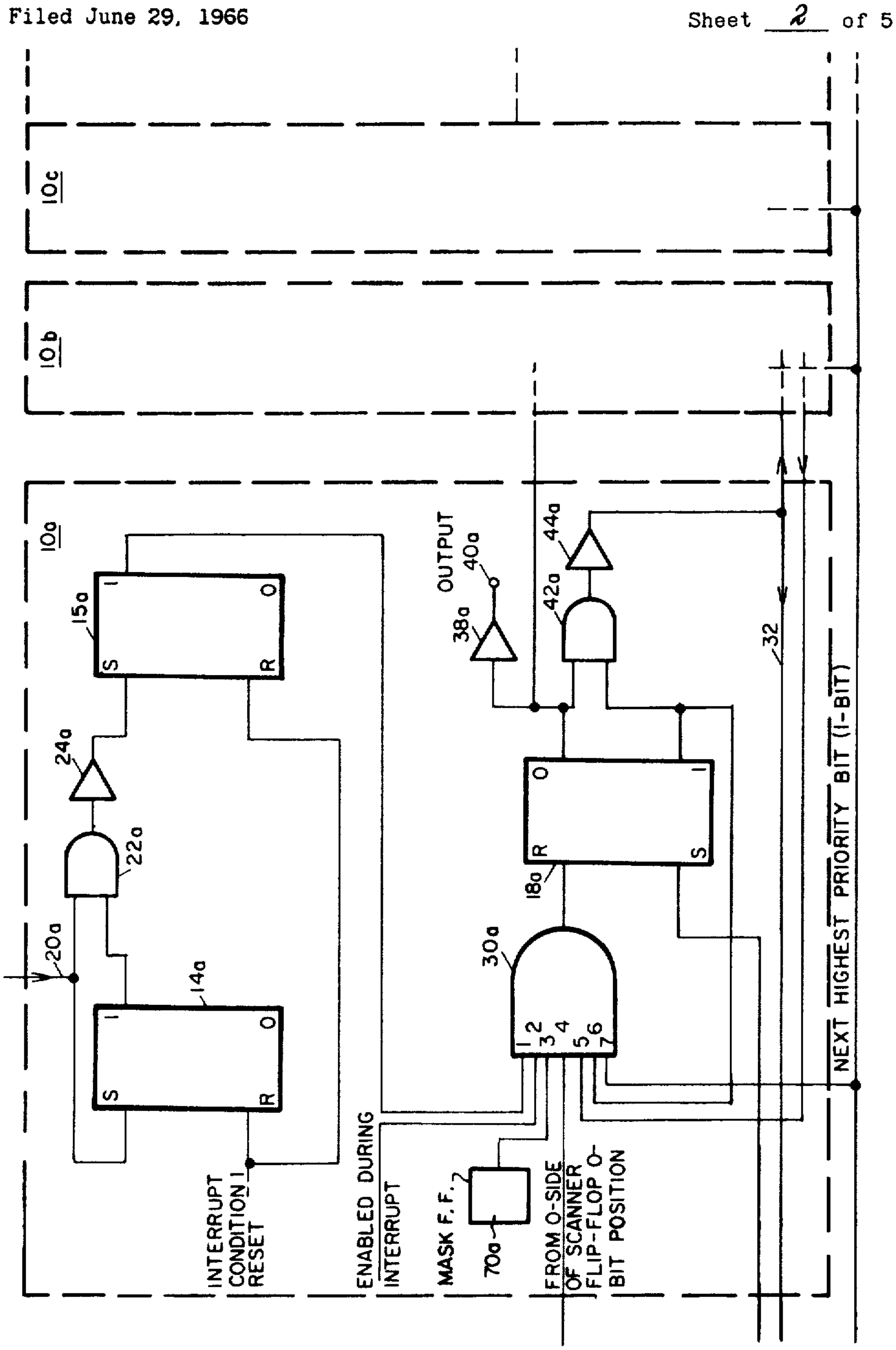
Figure 1D:
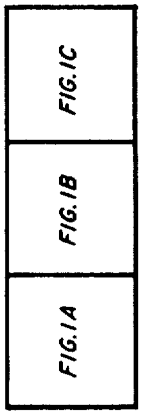
FIGURE 1D is a sheet layout of FIGURES 1A–1C.
Figure 1C:
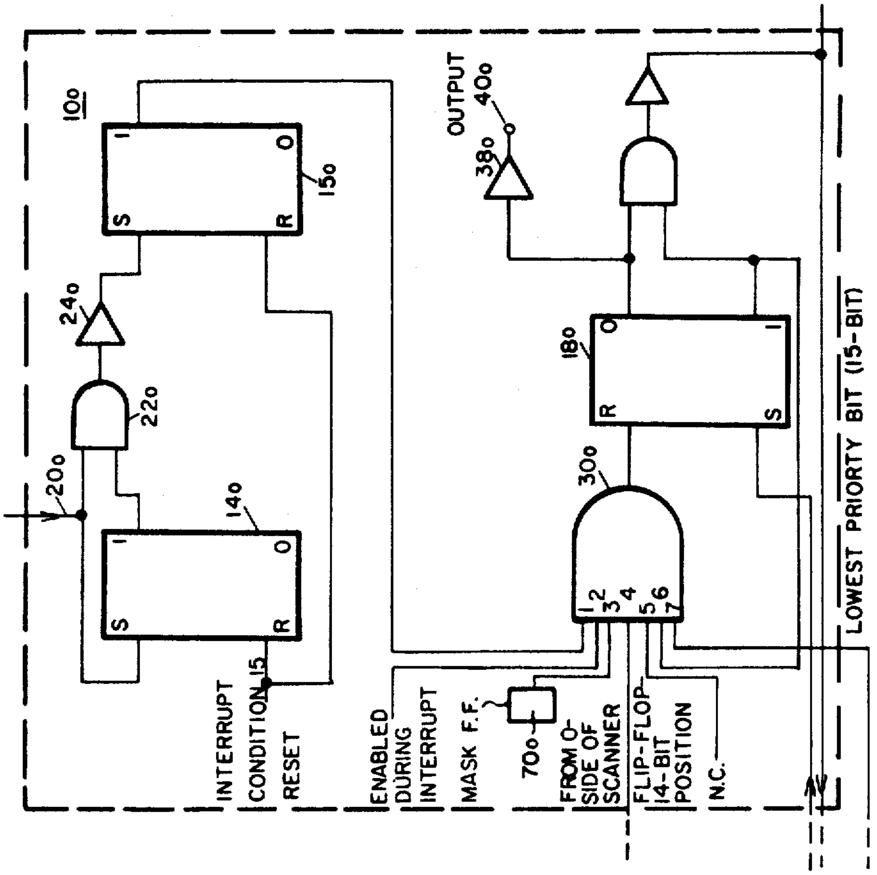

Referring now to FIGURES 1A–1C, there is illustrated a scanner which may be one of a plurality of scanners comprising a scanning system for a general purpose digital computer. Each of the scanners may include, for example, sixteen bit positions and a different interrupt position input is applied to each of the bit positions of each of the scanners. Since each of the scanners of the system is identical, only one has been illustrated. The interrupt conditions inputs may be internal conditions associated with a condition in the digital computer or an external condition. It will be understood that each of the interrupt condition inputs corresponds to a separate condition each of which has a differing priority, as described in the texts such as Planning a Computer System, edited by Werner Buchholz, McGraw-Hill Book Co., 1962, page 136 et seq.

In the illustrated scanner it will be understood that sixteen interrupt conditions inputs are applied with the highest priority interrupt condition being applied to the highest priority bit position (0-bit) 10; the next highest priority interrupt condition is applied to bit position 10*a* (1-bit) and so on until the sixteenth or least significant interrupt condition is applied to the lowest priority bit position (15-bit) 10*o*. In this manner within each of the scanners there is provided a structural priority determination by the position of the interrupt condition input applied to a particular bit position. It will be understood that the scanners of the interrupt system have a priority arrangement one with the other so there is a highest priority scanner and a lowest priority scanner with the scanners in between having intermediate priorities in sequence from the highest to the lowest. Thus it may be assumed that the illustrated scanner has a selected intermediate priority and interrupt conditions having priorities of higher magnitude are applied to higher priority scanners. As well known by those skilled in the art, within a scanner a priority may be established by means of programming. Specifically, a mask register may be connected to each of the scanner bit positions.

In the illustrated scanner only three bit positions have been illustrated, viz 0-bit, 1-bit and 15-bit, since each of the bit positions has similar circuitry, and only three bit positions are necessary to explain the operation of the scanner. The corresponding elements of the different bit positions have been identified by the same reference character plus a suffix corresponding to that particular position except for the 0-bit position 10 which is identified by the reference character alone. Each bit position includes three flip-flops 14, 15 and 18 of the type shown in FIGURE 2, later to be described in detail. Each flip-flop includes a set and a reset input and a 1-side and a 0-side output. To set a flip-flop to a 1-state, a low input is applied to the set terminal and a high input to the reset terminal.

For the purpose of this description, in binary terminology a 1-state signal corresponds to a logic high and a 0-state signal corresponds to a logic low. A flip-flop is in a 1-state when its 1-side is high and its 0-side is low. A flip-flop is in a 0-state when its 0-side is high and its 1-side is low.

To reset a flip-flop to the 0-state, a low is applied to the reset terminal and a high to the set terminal. In addition, a low applied to both the set and reset terminals of a flip-flop forces the 0-side and 1-side outputs to a 1 state.

In operation of the scanner, it may be assumed that a true interrupt condition input is applied by way of conductor 20 to 0-bit position 10*a*. This true condition is in the form of a high input which is applied to both the set input of the enable flip-flop 14 and to one of two inputs of an AND gate 22. The other input of AND gate 22 is connected to the 1-side of flip-flop 14.

It will be understood that prior to the time that the interrupt condition on conductor 20 is high, indicating a true interrupt condition, a low signal has been provided on conductor 20. Thus enable flip-flop 14 has been set to its 1-state so that its 1-side is in a 1-state. Upon application of a true interrupt input to bit position 10*a*, both inputs to AND gate 22 are high to produce a high output to an inverter 24 which produces a low output which is applied to the set input of interrupt condition flip-flop 15. The low input to the set side is effective to switch flip-flop 15 to its 1-state to produce a high output from its 1-side. In this manner flip-flop 15 is effective to "remember" that the interrupt input on conductor 20 is high even if the input 20 changes to a low.

The 1-side of flip-flop 15 is applied as a first of seven possible inputs to a scanner position AND gate 30. A second input to AND gate 30 may be a flag signal which enables the entire interrupt system. Specifically an enabling signal is applied to each AND gate 30 of each scanner position of each scanner in the interrupt system.

The third input to gate 30 corresponds to a mask register bit associated with the corresponding scanner bit position from a mask register consisting of a plurality of flip-flops 70–7*o*. Thus the mask register bit applied to bit position 10 is the highest priority mask bit of that scanner. As previously described, the programmer may select a suitable priority to be given to that mask bit. The fourth input to gate 30 is not used for the highest priority position 10 and will later be described for lower priority bit positions of the illustrated scanner.

The fifth input to gate 30 is the carry scan output of the next lower priority bit position. Thus for the highest priority bit position 10, the next lower priority bit position is position 10*a* with the carry-scan output being applied by way of conductor 32. This input enables gate 30 if, and until the scanning operation carries through the 1-bit position 10*a*. The sixth input to gate 30 is connected to the 1-side of a scanner flip-flop 18.

The seventh and last input to gate 30 is connected to a scanner reset output 34*a* of a source of scanner pulses 34 which source will later be described in detail.

Figure 4:
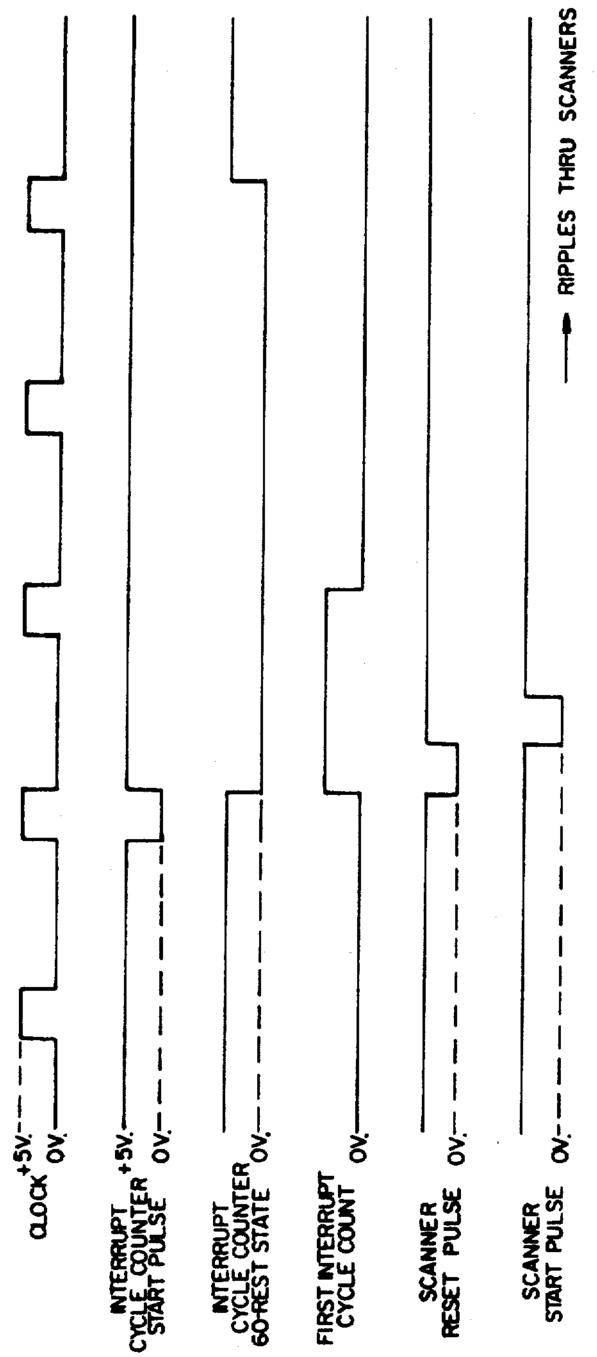
FIGURE 4 is a timing diagram showing various pulses used in FIGURES 1A–1C and 3.

Prior to the scanning operation, all of the scanner bit positions 10–10*o* are reset by means of a 0-state scanner reset pulse, FIGURE 4, applied by way of terminal 34*a* and bus 34*b* to the seventh input of a corresponding gate 30–30*o* of each of the scanner bit positions 10–10*o*. This low pulse disables each of the AND gates and produces therefrom a low output to the reset input of each of the corresponding scanner flip-flop 18–18*o* thereby producing a 0-state in each flip-flop. Therefore, the 1-side of each corresponding flip-flop 18–18*o* applies a disabling low input to terminal 6 of the corresponding gate. After the termination of the reset pulse from generator 34, it will be understood that a high input is again applied to terminal 7 of each of the gates 30–30*o*.

Referring again specifically to bit position 10, it will be seen that the low reset pulse from reset terminal 34*a* has been also applied to a delay network 36. After a predetermined time delay network 36 applies a low "start-scan" pulse, FIGURE 4, to the set input of flip-flop 18. With a low input applied to both set and reset inputs, both the 0-side and the 1-side of flip-flop 18 are in a 1-state. Thus an enabling high input is applied by way of 1-side of flip-flop 18 to input 6 of gate 30.

It will be recalled that the flip-flop 15 remembers that an interrupt condition has been applied to position 10*a* and is therefore in a 1-state with its 1-side. It will be assumed that for gate 30 inputs 2, 3, 5 and 7 are in a 1-state. Thus with the sixth input of gate 30 high, it will be understood that all of the inputs of gate 30 are high so that it produces a 1-state output which is applied to the reset terminal of flip-flop 18. Thus, only the 1-side of that flip-flop remains in the 1-state.

An inverter 38 has its input connected to the 0-side of flip-flop 18. Since that 0-side is in a 0-state, the output 40 of inverter 30 is in a 1-state indicated that the highest priority scanner bit position 10*a* is "locked." It will be understood that the 0-side of flip-flop 18 only changes to its 0-state if all of the inputs 1–7 to gate 30 are high. Therefore bit position output 40 is a true indication of the condition defined as "locked."

It will be recalled that during the time duration between the beginning of the start-scan pulse applied to the set terminal and the high output of gate 30 that both the 0 and 1-sides of flip-flop 18 are high. These high inputs are applied to an output AND gate 42 which produces a high output. The high output from gate 42 is applied through an inverter 44 as a low input to the set side of scanner flip-flop 18*a* of bit position 10*a*. This low signal is in a direction to start the scan of bit position 10*a* except that the low signal is terminated rapidly since all of the conditions have been met to enable AND gate 30. Thus the 0-side of flip-flop 18 is switched to its 0-state to disable AND gate 42. In this manner the high start-scan pulse applied to flip-flop 18*a* is immediately terminated when the next higher priority bit position 10 has been locked. In addition, the 0-state signal from the 0-side of flip-flop 18 is applied to the fourth input of AND gate 30*a*, thereby disabling that gate.

On the other hand if the 0-bit position 10 has not been locked, i.e., an interrupt condition on conductor 20 does not exist, then AND gate 30 is not enabled. Thus, a low input is maintained at the reset input of flip-flop 18*a* and both inputs of AND gate 32 are high. In this manner, a high start-scan pulse is maintained at the set input of flip-flop 18*a* of position 10*a*, thereby to switch the 1-side of that flip-flop to its 1-state with the 0-side remaining in its 0-state. With an enabling pulse applied to the sixth input of gate 30*a* and with all remaining conditions of that AND gate met then a high output is produced. Thus the 0-side of flip-flop 18*a* produces a low output and bit position 10*a* has been locked in the manner previously described for bit position 10.

It will now be understood that if an interrupt condition is not applied to position 10 then a start-scan pulse is effectively applied to bit position 10*a*. If an interrupt condition is applied to bit position 10*a* then that position is locked and a start-scan pulse is prevented from being propagated to position 10*b*. On the other hand, if position 10*a* is not locked then the start-scan pulse is propagated from position 10*a* to position 10*b*. If position 10*b* is not locked then the start-scan pulse is propagated to position 10*c*, etc., until it reaches the lowest priority bit position 10*o*. If position 10*o* is not locked then the start-scan pulse is propagated no further.

It will now be understood that in accordance with the invention in each of the bit positions a scanner flip-flop 18 produces a start-scan pulse when both its 0 and 1-sides are high. The anding of the two high signals by gate 42 provides the start-scan pulse which is applied to the scanner flip-flop of the next lower or succeeding priority bit position. The start-scan signal is in a direction to force the scanner flip-flop to produce a high at its 1-side to apply a high input to the sixth terminal of AND gate 30. If all conditions are met for that interrupt bit position a high output is produced from the AND gate and the scanner flip-flop is set to its 1-state thereby terminating the start-scan pulse applied to the next lower or succeeding bit position. In addition a disabling signal is applied to the AND gate of the succeeding bit position. On the other hand, if the conditions are not met in a bit position, a low signal remains applied to the reset input of the scanner flip-flop and the AND gate 42 is enabled during the entire time of the start-scan pulse applied to that bit position. In this manner a new start-scan pulse is propagated to the succeeding bit position. This operation continues with start-scan pulses being propagated until conditions are such that a bit position is locked up or the start-scan pulse is propagated to the last flip-flop 18*o* of the 15-bit position.

In operation it may be assumed that the 1-bit position 10*a* has been locked and a high output has been produced by its output terminal 40*a*. The output of each bit position is connected to control logic as described in the above cited text. The logic is decoded to determine the highest priority scanner having a locked position and a discrete selected address is produced associated with that position. In addition the normal program flow is interrupted, and the first instruction of a subroutine located at that selected address is fetched. This subroutine is operated on in the normal manner until the last instruction of the subroutine is reached or a higher priority interrupt occurs and interrupts the subroutine in the same manner as the normal program flow was interrupted. Upon completion of the subroutine the digital computer will automatically reenter the lower priority interrupt subroutine or the main program whichever the case may be.

At the last instruction, in addition, a low reset pulse is generated associated with a particular scanner and a scanner bit position. This reset pulse may be applied to the reset terminals of both the interrupt condition flip-flop 15 and the enable flip-flop 14 associated with the previously locked bit position. For example, in bit position 10 enable flip-flop 14 may be reset to a 0-state only if the interrupt condition input is high at the time the reset pulse is applied. Thus gate 22 is disabled since the 1-side of flip-flop 14 is low. In this way there is prevented the rerecognizing of a true interrupt condition which has just been serviced. Flip-flop 14 remains reset until the interrupt condition input of conductor 20 returns to its 0-state (not true interrupt condition) which is effective to set flip-flop 14. In this manner bit position 10 is prepared for a next interrupt input.

Figure 2:
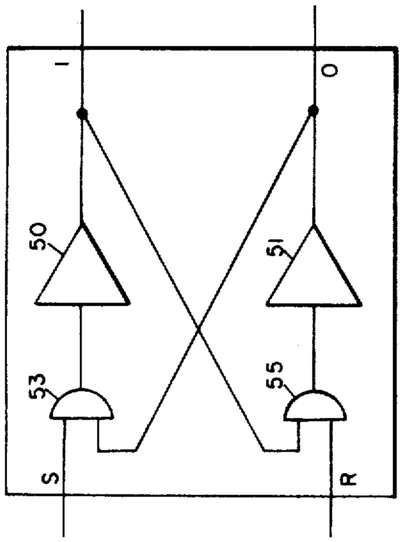
FIGURES 2 and 3 illustrate in detail circuit elements shown in block form in FIGURES 1A–1C.

Flip-flops 14–14*o*, 15–15*o* and 18–18*o* are D.C. flip-flops of the type shown in detail in FIGURE 2. The flip-flop comprises two cross-connected inverters 50 and 51 of the saturating type well known in the art. The set input terminal (S) of the flip-flop is connected to one input of a first AND gate 53, the other input of which is connected to the output of amplifier 51. Similarly the reset input terminal (R) is connected to one input of a second AND gate 55, the other input of which is connected to the output of amplifier 50. The 1-side output for the flip-flop is taken from the output of amplifier 50 while the 0-side output is taken from amplifier 51. It will now be understood that when a low input is applied to the set input and a high input to the reset input that the flip-flop will be in its 1-state and vice versa. On the other hand, if low inputs are applied to both the set and the reset input it will be seen that both the 1 and 0-sides of the flip-flop will be high. One of the flip-flop inputs, e.g., the set input, may be considered a first input and the reset input a second input. Similarly, the 1-side may, for example, be considered the first output and the 0-side the second output.

Figure 3:
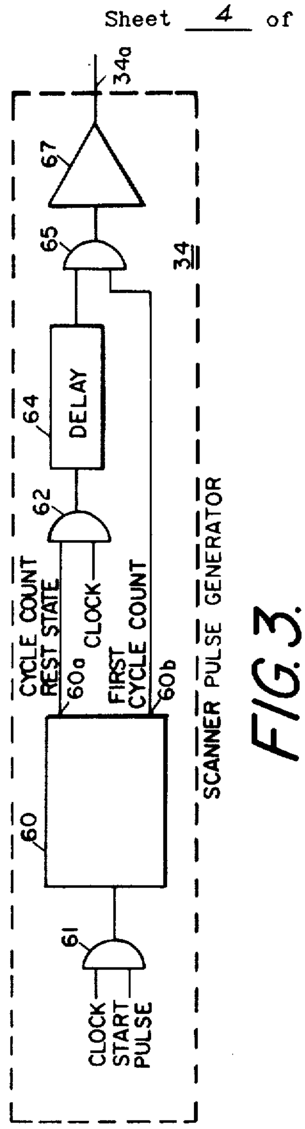

The scanner pulse generator 34 of FIGURE 1 is as shown in detail in FIGURE 3 and includes an interrupt cycle counter 60.

In operation an AND gate 61 has applied thereto clock pulses and a timing pulse indicated as a start pulse, the timing for which is indicated in FIGURE 4. The start pulse is initiated at the time it is desired to start the scanner of FIGURE 1A–1C. It will be understood that the initiation of the scan occurs at a predetermined time during the normal instruction flow of the program.

The output of gate 61 is connected to a four cycle counter of the type well known in the art which begins counting four clock pulses. Thus, as shown in FIGURE 4, at the termination of the start pulse and a corresponding clock pulse, counter 60 produces a negative going signal at the upper output 60*a* of counter 60. Output 60*a* indicates a "rest" state of the counter which is applied to an AND gate 62. The other input of gate 62 is applied from the source of the clock pulses. In this manner clock pulses are "anded" with the rest state output to produce a pulse of clock duration which is then delayed one clock pulse width by a delay network 64. The delayed pulse is anded in gate 65 with the four cycle count produced at the lower output terminal 60*b* of counter 60. The output of AND gate 65 is applied through an inverter 67 to produce the scanner reset pulse output 34*a* shown in FIGURE 4.

It will be understood by those skilled in the art that the above described detailed embodiment is meant to be merely exemplary and it is susceptible of modification without departing from the scope of the invention.

What is claimed is:

1. A digital computer interrupt system for servicing a plurality of interrupt conditions having a scanning system for receiving interrupt condition inputs comprising a plurality of bit position circuits arranged in priority sequence with each position having applied thereto an input indicative of an interrupt condition of corresponding significance, each of said positions comprising a D.C. scanner flip-flop and a first and a second AND gate, each flip-flop having at least a first and a second input and a first and a second output, each position having means connecting (1) a first output of said scanner flip-flop to an input of said first gate, (2) an output of said first gate to said second input of said scanner flip-flop, (3) said first and second outputs of said scanner flip-flop to inputs of said second gate, enable means for each position having applied thereto a corresponding interrupt condition input for applying an enable signal to the corresponding first gate when a true interrupt is applied, a generator for applying scanner pulses to an input of each first gate, each said scanner pulse disabling each first gate only for the time duration of the pulse for applying a first switching signal to said second input of the corresponding scanner flip-flop which produces an enabling signal to the corresponding second gate, delay means for said highest priority position connected to said generator to apply a start-scan signal to said first input of said scanner flip-flop to produce from said first output thereof enable signals to said inputs of said first and second gates, each said second gate connected to the second input of the succeeding priority scanner flip-flop for application of start-scan signals for the time duration of a start-scan pulse applied to that second gate thereby to propagate the start-scan signal from position to position except if all inputs to a first gate are enabled then that first gate produces a second switching signal to the corresponding scanner flip-flop which produces a disabling signal to the corresponding second gate to terminate the start-scan signal to the succeeding position.

2. The interrupt system of claim 1 in which for each position said enable means comprises an interrupt condition flip-flop having a first output connected to an input of the corresponding first AND gate.

3. The interrupt system of claim 2 in which there is provided for each position an enable flip-flop having a first output connected to an input of a third AND gate, means connecting the output of said third gate to a first input of said interrupt flip-flop, said interrupt condition input being applied (1) to an input of said third gate and (2) a first input of said enable flip-flop whereby a true interrupt condition is in direction to apply an enable signal to the third gate and to switch said enable flip-flop to produce another enable signal to said third gate.

4. The interrupt system of claim 3 in which there is provided for each position reset pulses applied to a second input terminal of said enable and interrupt flip-flops for resetting to its initial state said interrupt flip-flop and to reset said enable flip-flop only if a true interrupt condition input signal is applied at the time of said reset pulse thereby to prevent rerecognizing of a serviced true interrupt condition.

5. The interrupt system of claim 1 in which there is provided mask register means having a plurality of bit positions arranged in priority sequence, means connecting each register bit position with a first gate of a corresponding priority bit position of said scanning system to disable selected ones of said scanning positions.

6. The interrupt system of claim 5 in which each of said positions includes an inverter connected to said second output of said scanner flip-flop to provide a true output for said position indicating all of the inputs to said first gate are enable signals which shows that all conditions applied to that position have been met.

7. In a digital computer interrupt system for servicing a plurality of interrupt conditions, a scanning system for receiving interrupt condition inputs comprising a plurality of bit position circuits arranged in sequence according to priority significance from a highest priority to a lowest priority with each position having applied thereto an input indicative of an interrupt condition of corresponding significance, each of said positions comprising an interrupt condition flip-flop, a D.C. scanner flip-flop and a first and a second AND gate, each of said flip-flops having at least a first and a second input and a first and a second output, each position having means connecting (1) a first output of interrupt flip-flop to an input of said first gate, (2) an output of said first gate to said second input of said scanner flip-flop, (3) said first and second outputs of said scanner flip-flop to inputs of said second gate, enable means for each position connected to at least one input of said interrupt flip-flop and having applied thereto a corresponding interrupt condition input for applying an enable signal to the corresponding first gate when a true interrupt is applied, a scanner generator for applying scanner pulses to an input of each first gate, each said scanner pulse disabling each first gate in a position only for the time duration of the pulse for applying a first switching signal to the corresponding scanner flip-flop which produces (1) an enabling signal to the corresponding second gate and (2) a disabling signal to the first gate of the succeeding priority position, delay means for said highest priority position connected to said generator to produce a start-scan signal after the termination of said scanner pulse for application to said first input of said scanner flip-flop of a first switching signal to produce enabling signals to said inputs of said first and second gates, each said second gate when both of its inputs are enabled producing a start-scan signal applied to the second input of the succeeding priority scanner flip-flop for the time duration of a start-scan pulse applied to that second gate thereby to propagate the start-scan signal from position to position except if all inputs to a first gate are enabled at the time of a start-scan pulse applied to that position then that first gate produces a second switching signal to the corresponding scanner flip-flop which produces (1) a disabling signal to the corresponding second gate to terminate the start-scan signal to the succeeding position and (2) a disabling signal to the succeeding first gate thereby to prevent propagation of the start-scan signal and to lock up that position.

8. The interrupt system of claim 7 in which there is provided for each position an enable flip-flop having a first output connected to an input of a third AND gate, means connecting the output of said third gate to a first input of said interrupt flip-flop, said interrupt condition input being applied (1) to an input of said third gate and (2) a first input of said enable flip-flop whereby a true interrupt condition is in direction to apply an enable signal to the third gate and to switch said enable flip-flop to produce another enable signal to said third gate, said third gate upon application of said two enable signals applying a switching signal to said interrupt flip-flop to produce said enable signal to said first gate.

9. The interrupt system of claim 8 in which there is provided for each position reset pulses applied to a second input terminal of said enable and interrupt flip-flops for resetting said interrupt flip-flop and to reset said enable flip-flop only if a true interrupt condition input signal is applied at the time of said reset pulse thereby to prevent rerecognizing of a serviced true interrupt condition.

10. The interrupt system of claim 9 in which there is provided mask register means having a plurality of bit positions arranged in priority sequence, means connecting each register bit position with a first gate of a corresponding priority bit position of said scanning system to provide for disabling of selected ones of said scanning positions.

11. The interrupt system of claim 10 in which each said scanner flip-flop comprises a pair of cross-connected inverters each having connected to its input a respective AND gate whereby both outputs of said scanner flip-flop produce enable signals upon application of a start-scan signal and a first switching signal to said enable flip-flop.

12. The interrupt system of claim 10 in which each of said positions includes an inverter connected to said second output of said scanner flip-flop to provide a true output for said position indicating all of the inputs to said first gate are enable signals which shows that all conditions applied to that position have been met.

References Cited

UNITED STATES PATENTS

| | | | |
|---|---|---|---|
| 3,048,332 | 8/1962 | Brooks et al. | 340—172.5 |
| 3,221,309 | 11/1965 | Benghiat | 340—172.5 |
| 3,226,694 | 12/1965 | Wise | 340—172.5 |

PAUL J. HENON, *Primary Examiner.*

PAUL R. WOODS, *Assistant Examiner.*